United States Patent
Arakane et al.

(10) Patent No.: US 12,316,816 B2
(45) Date of Patent: May 27, 2025

(54) RECORDING APPARATUS CHANGING PROCESSING DEPENDING ON AN ADJUSTMENT TO AN AMOUNT OF RECORDING MATERIAL TO BE USED

(71) Applicant: BROTHER KOGYO KABUSHIKI KAISHA, Nagoya (JP)

(72) Inventors: Satoru Arakane, Nagoya (JP); Shota Morikawa, Nagoya (JP); Tomoya Kondo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 49 days.

(21) Appl. No.: 18/505,473

(22) Filed: Nov. 9, 2023

(65) Prior Publication Data

US 2024/0187538 A1 Jun. 6, 2024

(30) Foreign Application Priority Data

Nov. 30, 2022 (JP) ................. 2022-191289

(51) Int. Cl.
*H04N 1/00* (2006.01)
*H04N 1/195* (2006.01)
*H04N 1/23* (2006.01)
*H04N 1/58* (2006.01)

(52) U.S. Cl.
CPC ..... *H04N 1/00933* (2013.01); *H04N 1/00588* (2013.01); *H04N 1/1951* (2013.01); *H04N 1/19515* (2013.01); *H04N 1/2346* (2013.01); *H04N 1/2392* (2013.01); *H04N 1/58* (2013.01)

(58) Field of Classification Search
CPC ............. H04N 1/0057; H04N 1/00588; H04N 1/00933; H04N 1/195; H04N 1/19505; H04N 1/1951; H04N 1/19515; H04N 1/2346; H04N 1/2392; H04N 1/58; B41J 2/2132–2146; B41J 13/0027
See application file for complete search history.

(56) References Cited

U.S. PATENT DOCUMENTS

| | | | |
|---|---|---|---|
| 7,367,643 B2 * | 5/2008 | Furuichi | B41J 2/205 347/15 |
| 8,303,063 B2 * | 11/2012 | Kubota | B41J 2/2107 347/9 |
| 2009/0128838 A1 | 5/2009 | Yamamoto | |
| 2011/0310152 A1 * | 12/2011 | Muro | H04N 1/6025 347/14 |
| 2023/0294435 A1 * | 9/2023 | Tsuji | B41J 25/308 347/8 |
| 2024/0173970 A1 * | 5/2024 | Arakane | B41J 2/04551 |
| 2024/0179265 A1 * | 5/2024 | Arakane | H04N 1/6091 |

FOREIGN PATENT DOCUMENTS

JP 2009-141941 A 6/2009

* cited by examiner

*Primary Examiner* — Scott A Rogers
(74) *Attorney, Agent, or Firm* — Merchant & Gould P.C.

(57) ABSTRACT

A recording apparatus includes: a recording unit configured to perform recording of an image on a recording medium by using recording material; and a controller configured to execute a recording control regarding the recording. The controller is configured to execute an adjustment processing for adjusting an amount of the recording material to be used in the recording, and the controller is configured to change a processing other than the adjustment processing in the recording control between a case that the adjustment processing is executed and a case that no adjustment processing is executed.

13 Claims, 11 Drawing Sheets

RECORDING APPARATUS CHANGING PROCESSING DEPENDING ON AN ADJUSTMENT TO AN AMOUNT OF RECORDING MATERIAL TO BE USED

REFERENCE TO RELATED APPLICATIONS

This application claims priority from Japanese Patent Application No. 2022-191289 filed on Nov. 30, 2022. The entire content of the priority application is incorporated herein by reference.

BACKGROUND ART

Conventionally, there is known an image processing apparatus that adjusts density of image data according to adjustment values.

DESCRIPTION

In a case that an adjustment is made to increase an amount of recording material, if the same recording control is executed as a case of executing an adjustment to reduce the amount of the recording material or a case of executing no adjustment to the amount of the recording material, various problems may occur. For example, in a case of a recording medium that easily swells due to penetration of the recording material, if the amount of the recording material is too large, the swollen recording medium may contact with components in the recording apparatus, causing the components to be soiled with the recording material or the recording medium to be clogged, resulting in the recording medium being dirty.

In a case that an adjustment is made to reduce the amount of the recording material, if the same recording control is executed as the case of executing an adjustment to increase the amount of the recording material or as the case of executing no adjustment to the amount of the recording material, various problems may occur. For example, in a case that the amount of the recording material is small, it is difficult for the recording medium to swell. In spite of this, if a longer waiting time is provided to suppress the problem caused by swelling, the recording time becomes longer, and a high-speed recording cannot be achieved. If the amount of the recording material is small, even if bidirectional scanning processing is executed, color differences caused by the difference in the overlapping order of ink between onward movement and return movement are unlikely to occur. Nevertheless, if unidirectional scanning processing is performed to suppress the above problem of color differences, the recording speed will be reduced and high-speed recording cannot be achieved.

An object of the present teaching is to provide a recording apparatus that can suppress the problems which may occur when the amount of the recording material is adjusted.

According to an aspect of the present teaching, there is provided a recording apparatus including: a recording unit configured to perform recording of an image on a recording medium by using recording material; and a controller configured to execute a recording control regarding the recording, wherein the controller is configured to execute an adjustment processing for adjusting an amount of the recording material to be used in the recording, and the controller is configured to change a processing other than the adjustment processing in the recording control between a case that the adjustment processing is executed and a case that no adjustment processing is executed.

FIRST EMBODIMENT

Figure 1:
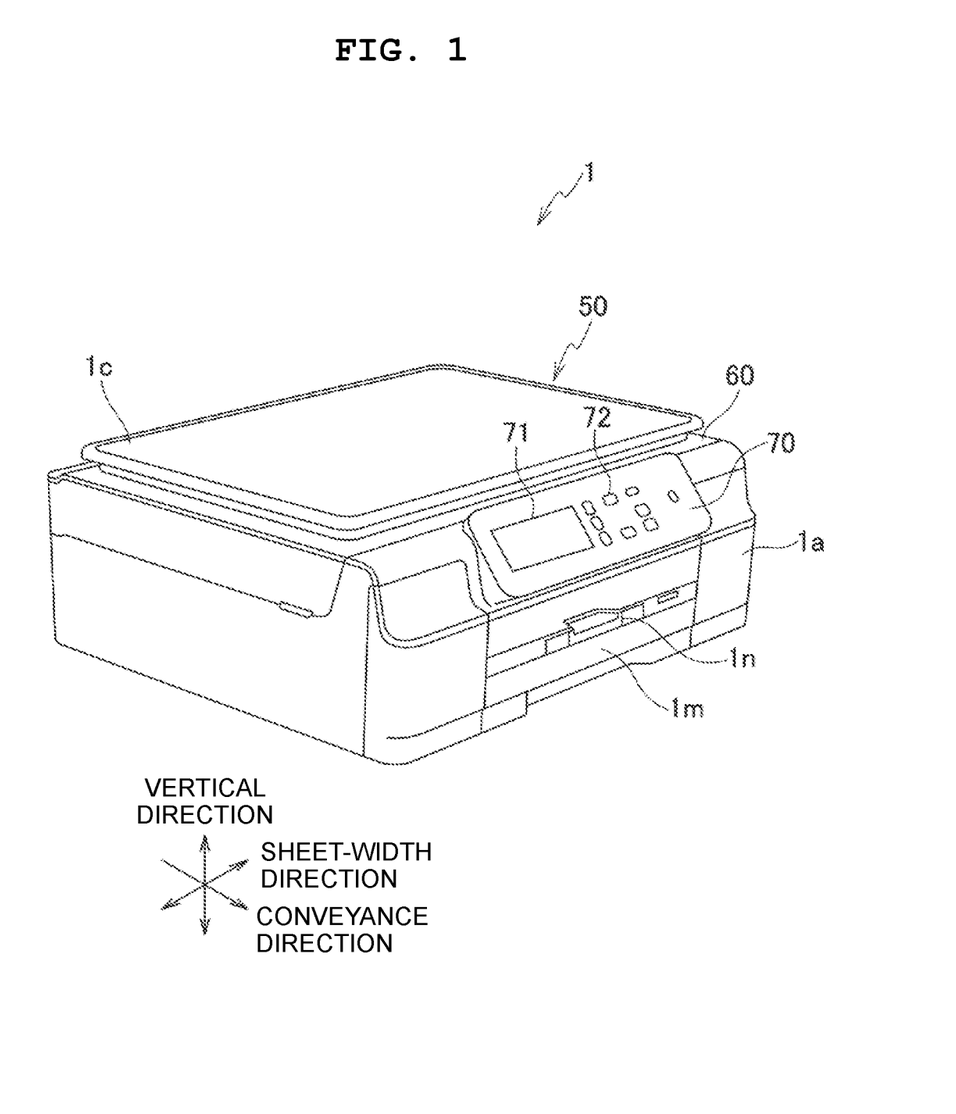
FIG. 1 is a perspective view of a multifunction peripheral of a first embodiment of the present teaching.

As depicted in FIG. 1, a multifunction peripheral 1 of the first embodiment of the present teaching has a housing 1a, a flatbed type reading unit 50 provided at the top of the housing 1a, a cover 1c openably attached to the top of the housing 1a, a paper feed tray 1m and a paper discharge tray in which can be withdrawn from the housing 1a. The front surface of the housing 1a has a panel 70. The front surface is the downstream side of a conveyance direction. The panel 70 includes a touch panel display 71 and operation buttons 72.

Figure 2:
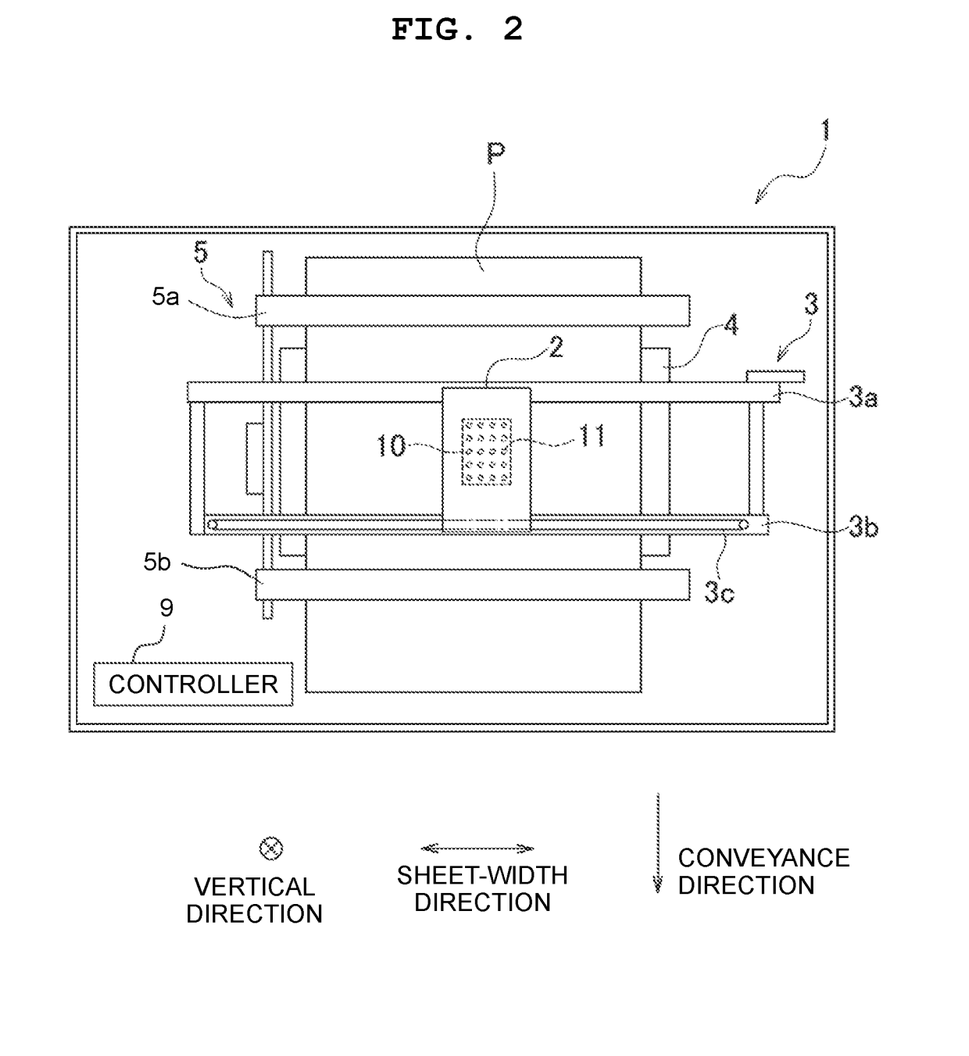
FIG. 2 is a plan view depicting an inside of a casing of the multifunction peripheral.

Inside the housing 1a, as depicted in FIG. 2, there is provided a head 10 with a plurality of nozzles 11 on a lower surface thereof, a carriage 2 that holds the head 10, a scanning unit 3 that moves the carriage 2 in a paper width direction, a platen 4 that supports the paper sheet P from below, a conveying unit 5 that conveys the paper sheet P in the conveyance direction, and a controller 9.

The paper sheet P corresponds to the "recording medium" of the present teaching, the head 10 corresponds to the "recording unit" of the present teaching, and the multifunction peripheral 1 corresponds to the "recording apparatus" of the present teaching. The paper width direction and conveyance direction are orthogonal to the vertical direction and are orthogonal to each other. The paper width direction corresponds to the "scanning direction" of the present teaching.

The scanning unit 3 includes a pair of guides 3a, 3b supporting the carriage 2 and a belt 3c connected to the carriage 2. The guides 3a, 3b and the belt 3c extend in the paper width direction. If the carriage motor 3M (see FIG. 3) is driven by the controller 9, the belt 3c runs and the carriage 2 moves along the guides 3a, 3b in the paper width direction.

The platen 4 is arranged below the carriage 2 and the head 10. The paper sheet P is placed on a top surface of the platen 4.

The conveying unit 5 has a paper feed roller (not depicted) in the paper feed tray 1m (see FIG. 1) and two roller pairs 5a and 5b. The head 10, the carriage 2, and the platen 4 are arranged between the roller pairs 5a and 5b in the conveyance direction. If the conveyance motor 5M (see FIG. 3) is driven under the control of the controller 9, each of the paper sheets P arranged in the paper feed tray 1m (see FIG. 1) is fed by the paper feed roller, conveyed in the conveyance direction by the roller pairs 5a and 5b, passes under the head 10 and is received in the paper discharge tray in (see FIG. 1).

Figure 3:
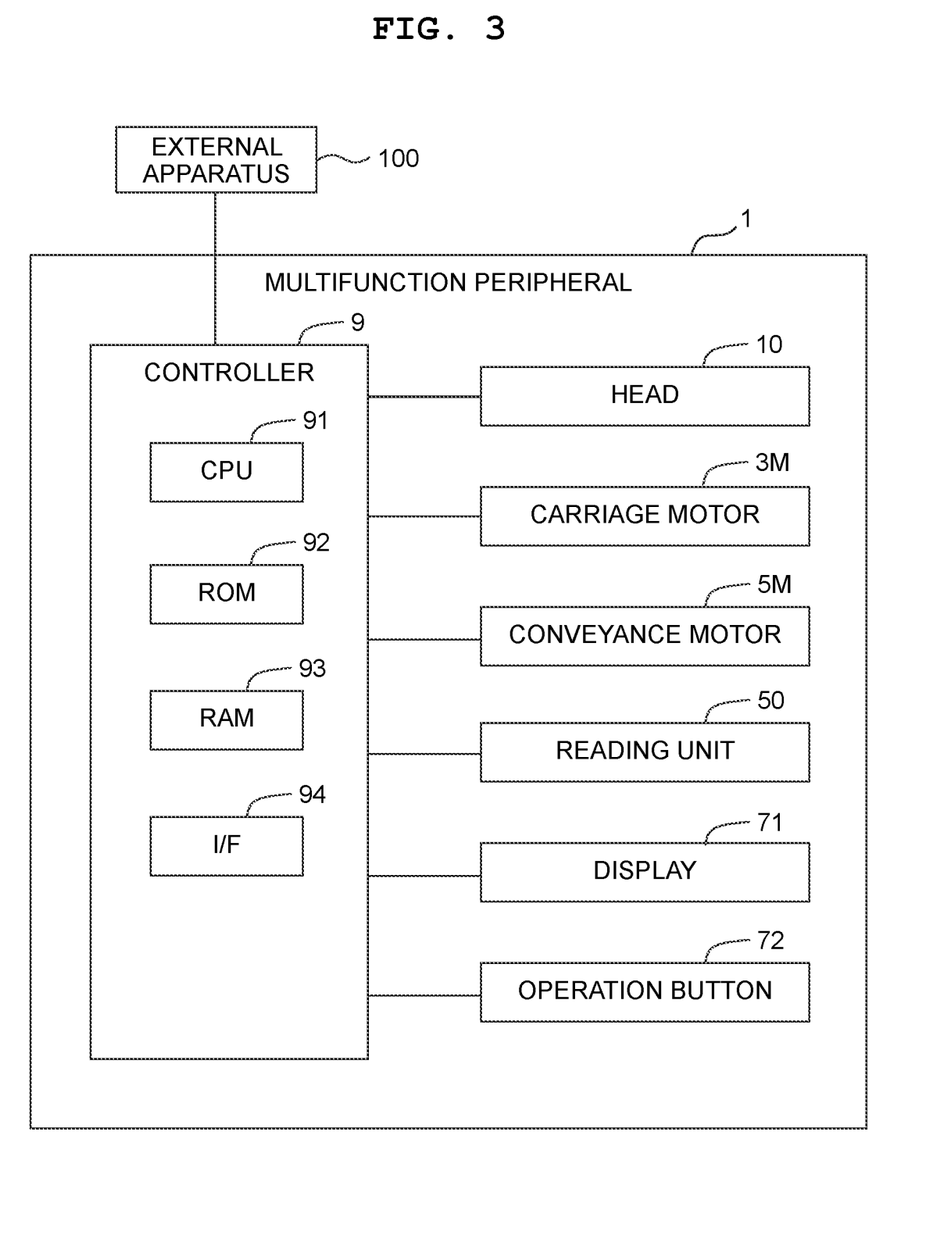
FIG. 3 is a block diagram depicting an electrical configuration of the multifunction peripheral.

The controller 9 has a CPU (Central Processing Unit) 91, a ROM (Read Only Memory) 92, a RAM (Random Access Memory) 93, and an I/F (Interface) 94, as depicted in FIG. 3. Programs and data for the CPU 91 to perform various controls are stored in the ROM 92. Data used when the CPU 91 executes the programs is temporarily stored in the RAM 93. The I/F 94 transmits and receives data to and from outside.

The CPU 91 corresponds to the "controller" of the present teaching and executes the recording control, based on the data (including image data indicating images) received by the I/F 94 and in accordance with the programs and data stored in the ROM 92 and the RAM 93. The recording control is a control related to recording an image on the paper sheet P, and includes a conveying processing in which the conveying unit 5 conveys the paper sheet P by a predetermined distance in the conveyance direction, and a scanning processing in which ink is discharged from the nozzles 11 onto the paper sheet P while moving the head 10 in the paper width direction by the scanning unit 3. As a result, dots of ink are formed on the paper sheet P and an image is recorded.

The reading unit 50 has a document stand 60 (see FIG. 1) configured by the top of the housing 1A and a reading unit (not depicted) inside the housing 1A. If the cover 1c is open, a document is placed on the document stand 60. The cover 1c is then closed to prevent light from the outside from entering the reading unit. An image data of the document read by the reading unit is transmitted to the controller 9.

The multifunction peripheral 1 has a scanning function to read an image of a document by the reading unit 50, a copy function to record the image read by the reading unit 50 on the paper sheet P, a facsimile function to record an image on the paper sheet P based on facsimile data received from the external apparatus 100, and a print function to record an image on the paper sheet P based on a recording instruction received from the external device 100.

In response to a user's instruction for each function via the display 71 and the operation buttons 72, the CPU 91 executes application program corresponding to the function. For the print function, in response to receiving the recording instruction from the external apparatus 100, the CPU 91 executes the application program corresponding to the print function.

In the application program corresponding to the print function, the CPU 91 can adjust an amount of ink used during recording. Specifically, the CPU 91 adjusts the amount of ink used during the recording in response to the user indicating the desired ink amount on an ink amount adjustment screen displayed on the display 71.

Figure 4:
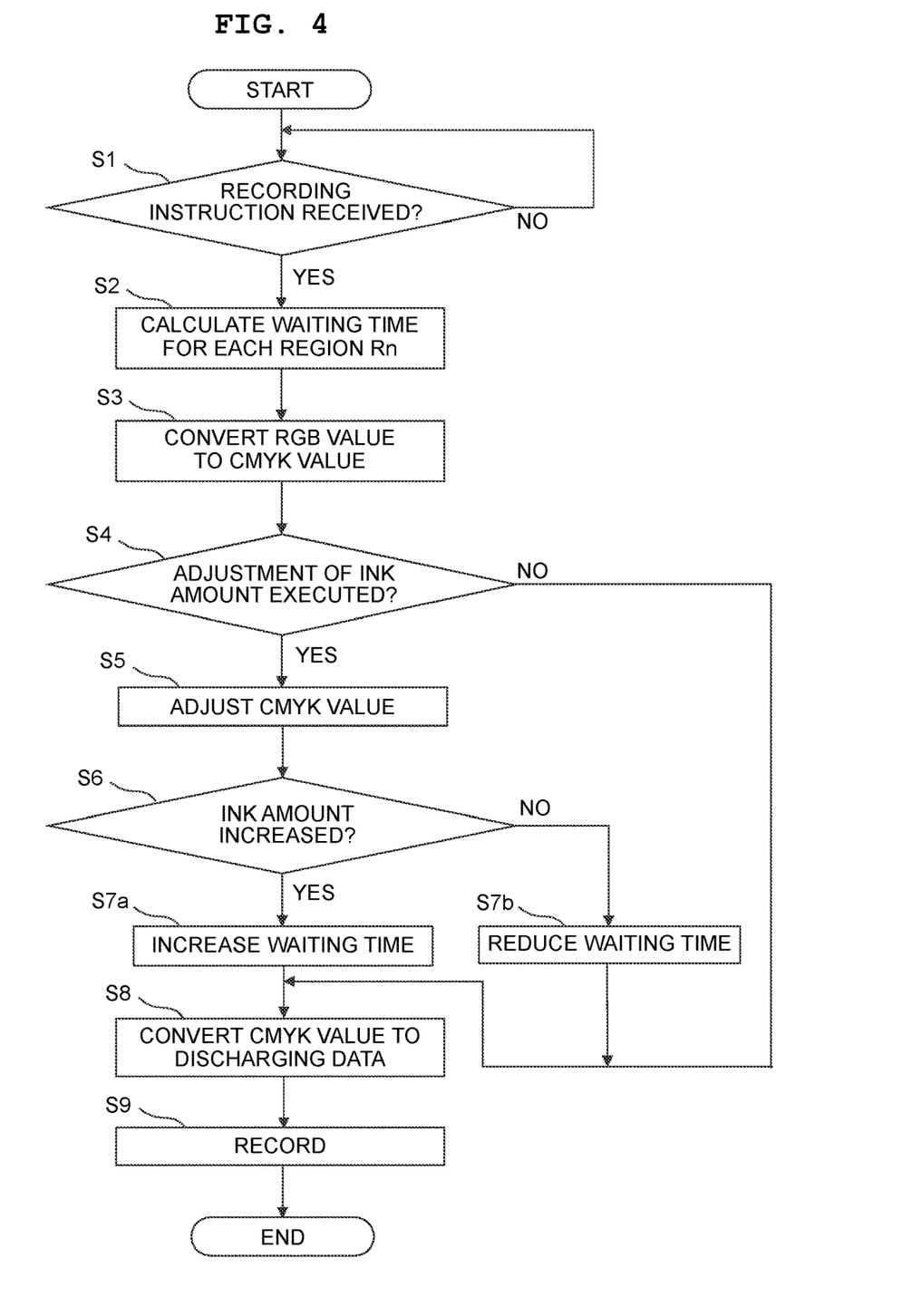
FIG. 4 is a flow chart of an application program corresponding to a print function executed by a CPU of the multifunction peripheral.

Referring to FIG. 4, the application program corresponding to the print function is described.

At first, the CPU 91 determines whether a recording instruction is received from the external apparatus 100 (S1).

If the CPU 91 determines that no recording instruction has been received from the external apparatus 100 (S1: NO), the CPU 91 repeats the process of S1.

If the CPU 91 determines that the recording instruction is received from the external apparatus 100 (S1: YES), the CPU 91 calculates the waiting time for each region Rn (n=1 to x) of the paper sheet P (S2).

Figure 5:
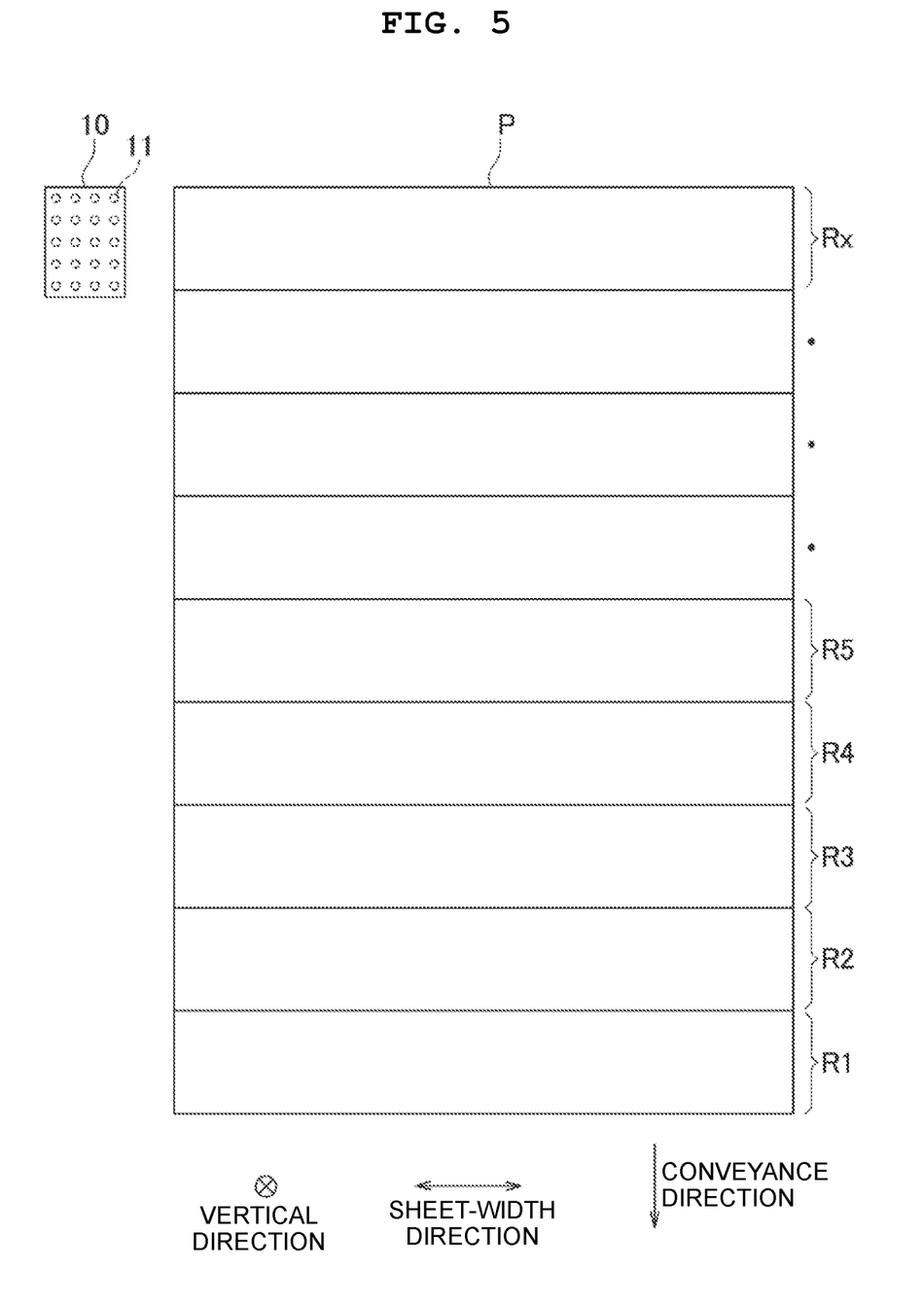
FIG. 5 is a schematic diagram depicting each region corresponding to a scanning processing.

Regions R1 through Rx are rectangular regions extending in the paper width direction, respectively, and are aligned in the conveyance direction, as depicted in FIG. 5. For example, the region R1 corresponds to the "first region" of the present teaching and the region R2 corresponds to the "second region" of the present teaching, and they are adjacent to each other in the conveyance direction. The length of each region Rn in the conveyance direction corresponds to the length in the conveyance direction of a region where the nozzles 11 are arranged in the head 10.

The recording instruction contains image data for each region Rn.

A recording control executed by the CPU 91 includes a first recording processing for causing the head 10 to perform recording on the region R1 based on the image data for the region R1, and a second recording processing for causing the head 10 to perform recording on the region R2 based on the image data for the region R2 after a waiting time has elapsed from the first recording process. Both the first and second recording processings correspond to the scanning processing. The image data for the region R1 corresponds to the "first image data" of the present teaching, and the image data for the region R2 corresponds to the "second image data" of the present teaching. The recording control also includes recording processings corresponding to the regions R3 through Rx.

In S2, the CPU 91 calculates the waiting time for each region Rn based on the image data for each region Rn and a calculation table which is stored in the ROM 92 and in which the image data and the waiting time are associated with each other.

After S2, the CPU 91 converts the RGB (red, green, blue) values corresponding to the colors of the image indicated by the image data included in the recording instruction to CMYK values corresponding to the colors of the ink (S3).

After S3, the CPU 91 determines whether to adjust an amount of the ink based on a signal from the display 71 (see FIG. 3) (S4).

If the CPU 91 determines that the amount of the ink is not to be adjusted (S4: NO), the CPU 91 advances the process to S8.

If the CPU 91 determines that the amount of ink is to be adjusted (S4: YES), the CPU 91 adjusts the CMYK values obtained in S3 based on the adjustment values indicated by the signal (S5: Adjustment processing).

After S5, the CPU 91 determines whether the adjustment processing is a processing for increasing the amount of the ink (S6).

If S5 is the adjustment processing for increasing the amount of the ink (S6: YES), the CPU 91 increases (lengthens) the waiting time for each region Rn (S7a). For example, if the waiting time calculated in S2 is "1 second", it is set to "2 seconds".

If S5 is an adjustment processing for reducing the amount of the ink (S6: NO), the CPU 91 reduces (shortens) the waiting time for each region Rn (S7b). For example, if waiting time calculated in S2 is "1 second", the waiting time is set to "0.5 second".

After S7a or S7b, the CPU 91 advances the process to S8.

In S8, the CPU 91 converts the CMYK values to discharging data (second conversion processing). The discharging data indicates the volume of ink to be discharged from each nozzle 11 (large droplet, medium droplet, small droplet, or zero) for each recording cycle (the time required for the paper sheet P to move relative to the head 10 by a unit distance corresponding to the resolution of the image formed on the paper sheet P).

If an adjustment is made to reduce the ink amount, the ink volume may be changed from a large droplet to a medium droplet, or the ink volume may be changed from the medium droplet to a small droplet in a given recording cycle. If an adjustment is made to increase the ink amount, the ink volume may be changed from the medium droplet to the large droplet or from the small droplet to the medium droplet in the given recording cycle.

After S8, the CPU 91 controls the conveying unit 5, the scanning unit 3, and the head 10 to record the image on the paper sheet P (S9). If no adjustment processing is performed, the recording control is executed with the waiting time for each region Rn as the time calculated in S2 (e.g., 1 second). On the other hand, if the adjustment processing to increase the ink amount is executed, the recording control is executed with the waiting time for each region Rn (e.g., 2 seconds) longer than the time calculated in S2. If the adjustment processing to reduce the ink amount is executed, the recording control is executed with the waiting time for each region Rn (e.g., 0.5 second) shorter than the time calculated in S2.

After S9, the CPU 91 terminates the program.

As described above, according to this embodiment, the recording control is performed differently between when the adjustment processing is executed and when no adjustment processing is executed. Specifically, in this embodiment, the waiting time in the recording control is different between the case where the adjustment processing is executed and the case where the adjustment processing is not executed. This allows various problems that may occur when the ink amount is adjusted to be suppressed.

If an adjustment is made to increase the ink amount, the problems due to swelling of the paper sheet P can easily occur. Specifically, the swollen paper sheet P may come into contact with components in the multifunction peripheral 1, which may cause the components to be soiled with ink, or the paper sheet P may be soiled due to a jam of the paper sheet P. Therefore, in such a case, by increasing the waiting time in S7a, the swelling of the paper sheet P is reduced during the waiting time, and the problem caused by the swelling of the paper sheet P can be suppressed.

If an adjustment is made to reduce the ink amount, the problems due to swelling of the paper sheet P are less likely to occur. Therefore, in such cases, high-speed recording can be achieved by shortening the waiting time.

SECOND EMBODIMENT

The second embodiment of the present teaching will then be described.

The scanning processing includes a "unidirectional scanning processing" in which the head 10 is made to record in either onward movements or return movements of the head 10 along the paper width direction, and a "bidirectional scanning processing" in which the head 10 is made to record in both the onward movements and the return movements of the head 10 along the paper width direction.

In the first embodiment, the recording control is executed with a different "waiting time" between in the case of executing the adjustment processing and in the case of not executing the adjustment processing. In contrast, in the second embodiment, the recording control is different in "criteria for determining whether the scanning processing is the unidirectional scanning processing or the bidirectional scanning processing" between in the case where the adjustment processing is executed and in the case where adjustment processing is not executed.

The nozzles 11 are arranged asymmetrically in the paper width direction. Specifically, from one side (left side of FIG. 5) to the other (right side of FIG. 5) in the paper width direction, a nozzle row that discharges black (K) ink, a nozzle row that discharges yellow (Y) ink, a nozzle row that discharges magenta (M) ink, and a nozzle row that discharges cyan (C) ink are arranged in this order. In other words, from the other side (right side of FIG. 5) to the one side (left side of FIG. 5) of the paper width direction, the nozzle rows which discharge the cyan (C) ink, the magenta (M) ink, the yellow (Y) ink, and the black (K) ink are arranged in this order.

Therefore, there is a difference in overlapping order of the inks between the onward movement and the return movement. When casing the head 10 to perform the onward movement (from the one side (left side of FIG. 5) to the other (right side of FIG. 5) in the paper width direction), the inks are discharged in the order of CMYK and the inks land on the paper sheet P in the order of CMYK. When causing the head 10 to perform the return movement (from the other side (right side of FIG. 5) to the one side (left side of FIG. 5) in the paper width direction), the inks are discharged in the order of KYMC, and the inks are land on the paper sheet P in the order of KYMC.

In a case that the overlapping order of the inks differs between the onward movement and the return movement, the colors of the overlapped inks on the paper sheet P may appear different from each other, even if the ink type and ink amount of each color are the same between the onward movement and the return movement. In order to suppress such differences in color (color difference) caused by the difference in the overlapping order of the inks, it is determined whether the scanning processing should be the unidirectional scanning processing or the bidirectional scanning processing is determined, based on an evaluation table stored in the ROM 92. The evaluation table is a table in which a plurality of pairs of pixel values (RGB values: gradation values from 0 to 255) and a plurality of weight values corresponding to the plurality of pairs of pixel values respectively are associated with each other. The ROM 92 corresponds to the "memory" of the present teaching.

For example, the weight values corresponding to the pairs of pixel values of each pixel are integrated for each divided region divided from a region Rx. If the integrated weight value does not exceed a threshold value in any divided region, it is determined that the bidirectional scanning processing is to be performed. If the integrated weight value exceeds the threshold value in any region, it is determined that the unidirectional scanning processing is to be performed.

Figure 6:
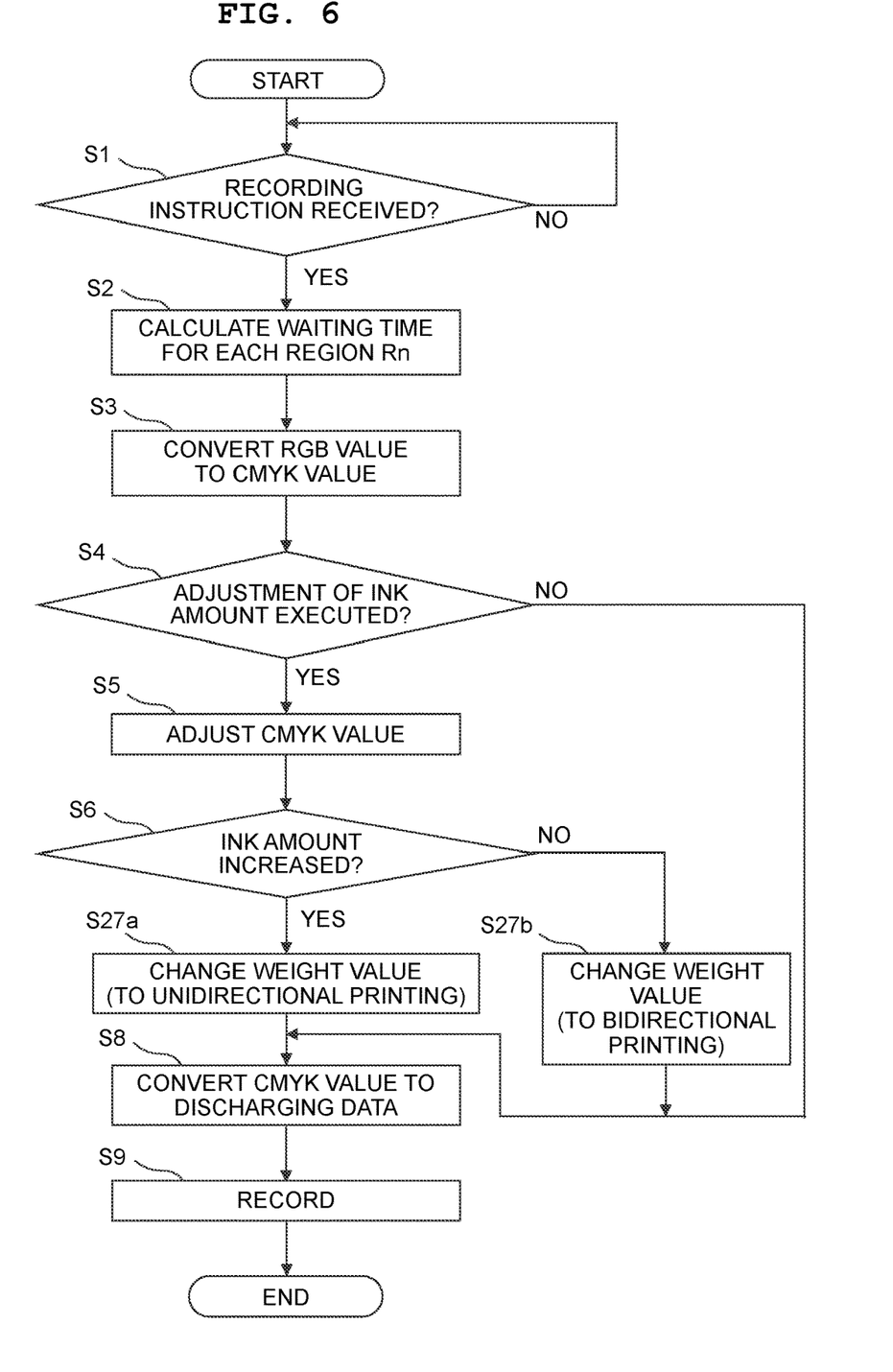
FIG. 6 is a flow chart of an application program corresponding to a print function executed by a CPU of a multifunction peripheral of a second embodiment of the present teaching.

The CPU 91 executes the same processing as in the first embodiment (see FIG. 4), except for S7a and S7b in the application program corresponding to the print function (see FIG. 6).

If S5 is an adjustment processing to increase the ink amount (S6: YES), the CPU 91 changes the weight values in the above evaluation table such that the unidirectional scanning processing is more easily determined to be performed (S27a), instead of S7a.

If S5 is an adjustment processing to reduce the ink amount (S6: NO), the CPU 91 changes the weight values in the above evaluation table such that the bidirectional scanning processing is more easily determined to be performed (S27b), instead of S7b.

If the adjustment processing is not performed (S4: NO), the scanning process is determined to be either the unidirectional scanning processing or the bidirectional scanning processing based on the original evaluation table stored in the ROM 92. On the other hand, if the adjustment processing is performed (S4: YES) and the adjustment processing is a process to increase the ink amount (S6: YES), then based on the evaluation table with the weight values changed in a direction to determine the unidirectional scanning processing, the scanning processing is determined to be either the unidirectional scanning processing or the bidirectional scanning processing. If the adjustment processing is performed (S4: YES) and the adjustment processing is a process to reduce the ink amount (S6: NO), then based on the evaluation table with the weight values changed in a direction to determine the bidirectional scanning processing, the scanning processing is determined to be either the unidirectional scanning processing or the bidirectional scanning processing.

If the adjustment is made to increase the ink amount, the color differences are likely to occur due to the difference in the overlapping order of the inks between the onward movement and the return movement. In this case, the color differences can be suppressed by changing the weight values in the direction to determine the unidirectional scanning processing and performing the unidirectional scanning processing.

If the adjustment is made to reduce the ink amount, the color differences caused by the difference in the overlapping order of the ink droplets between the onward movement and the return movement are unlikely to occur. In this case, a high-speed recording can be achieved by changing the weight values in the direction to determine the bidirectional scanning processing and performing the bidirectional scanning processing.

THIRD EMBODIMENT

The third embodiment of the present teaching will then be described.

Figure 7:
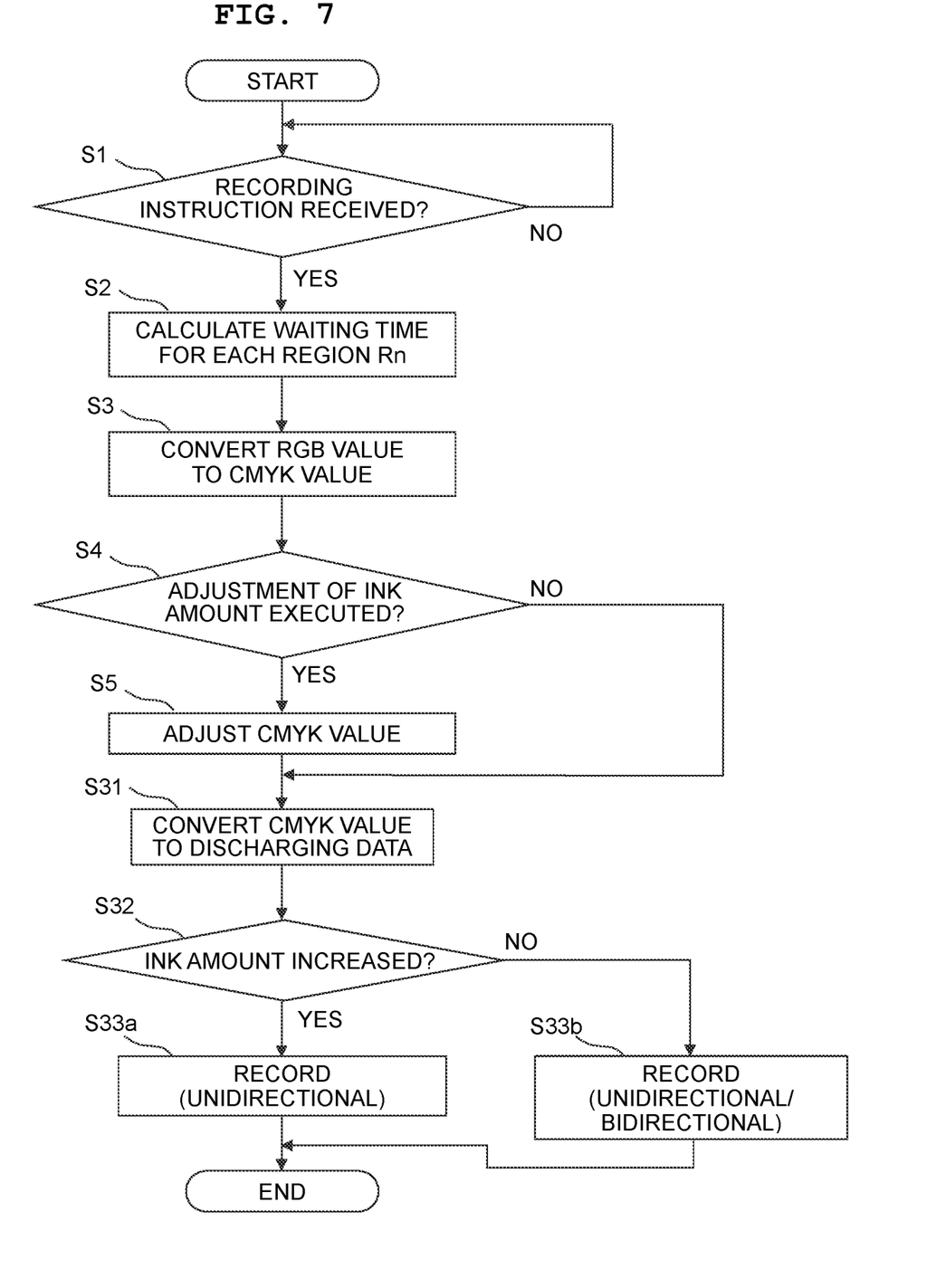
FIG. 7 is a flow chart of an application program corresponding to a print function executed by a CPU of a multifunction peripheral of a third embodiment of the present teaching.

In the third embodiment, if the adjustment processing in the direction to increase the ink amount is executed, the unidirectional scanning processing is performed. On the other hand, if the adjustment processing in the direction to reduce the ink amount is executed or if the adjustment processing is not executed, either the unidirectional scanning processing or bidirectional scanning processing is determined to be performed based on the evaluation table.

In the application program corresponding to the print function (see FIG. 7), at first, the CPU 91 executes S1-S4 as in the first embodiment (see FIG. 4).

If it is determined that the ink amount is not to be adjusted (S4: NO), the CPU 91 advances the process to S31.

If it is determined that the ink amount is to be adjusted (S4: YES), the CPU 91 executes S5 similar to the first embodiment (see FIG. 4), and then advances the process to S31.

In S31, the CPU 91 converts the CMYK values to discharging data, as in S8 of the first embodiment (see FIG. 4).

After S31, the CPU 91 determines whether an adjustment processing to increase the ink amount has been performed (S32).

If it is determined that the adjustment processing to increase the ink amount has been performed (S32: YES), the CPU 91 performs the unidirectional scanning processing in the recording control (S33a).

If it is determined that the adjustment processing to reduce the ink amount has been performed or that no adjustment processing has been performed, the CPU 91 determines whether the unidirectional scanning processing or the bidirectional scanning processing should be performed in the recording control based on the evaluation table (S33b).

After S33a or S33b, the CPU 91 terminates the program.

If the adjustment is performed to increase the ink amount, the color differences are likely to occur due to the difference in the overlapping order of the ink droplets between the onward movement and the return movement. In this case, the color differences can be suppressed by executing the unidirectional scanning processing.

FOURTH EMBODIMENT

The fourth embodiment of the present teaching will then be described.

In the third embodiment, the unidirectional scanning process is executed without any notification to the user, whereas in the fourth embodiment, the user is notified before the unidirectional scanning processing is executed.

In the application program corresponding to the print function (see FIG. 8), the CPU 91 further executes the processes of S41 and S42 in addition to the processes of the third embodiment (see FIG. 7).

Figure 8:
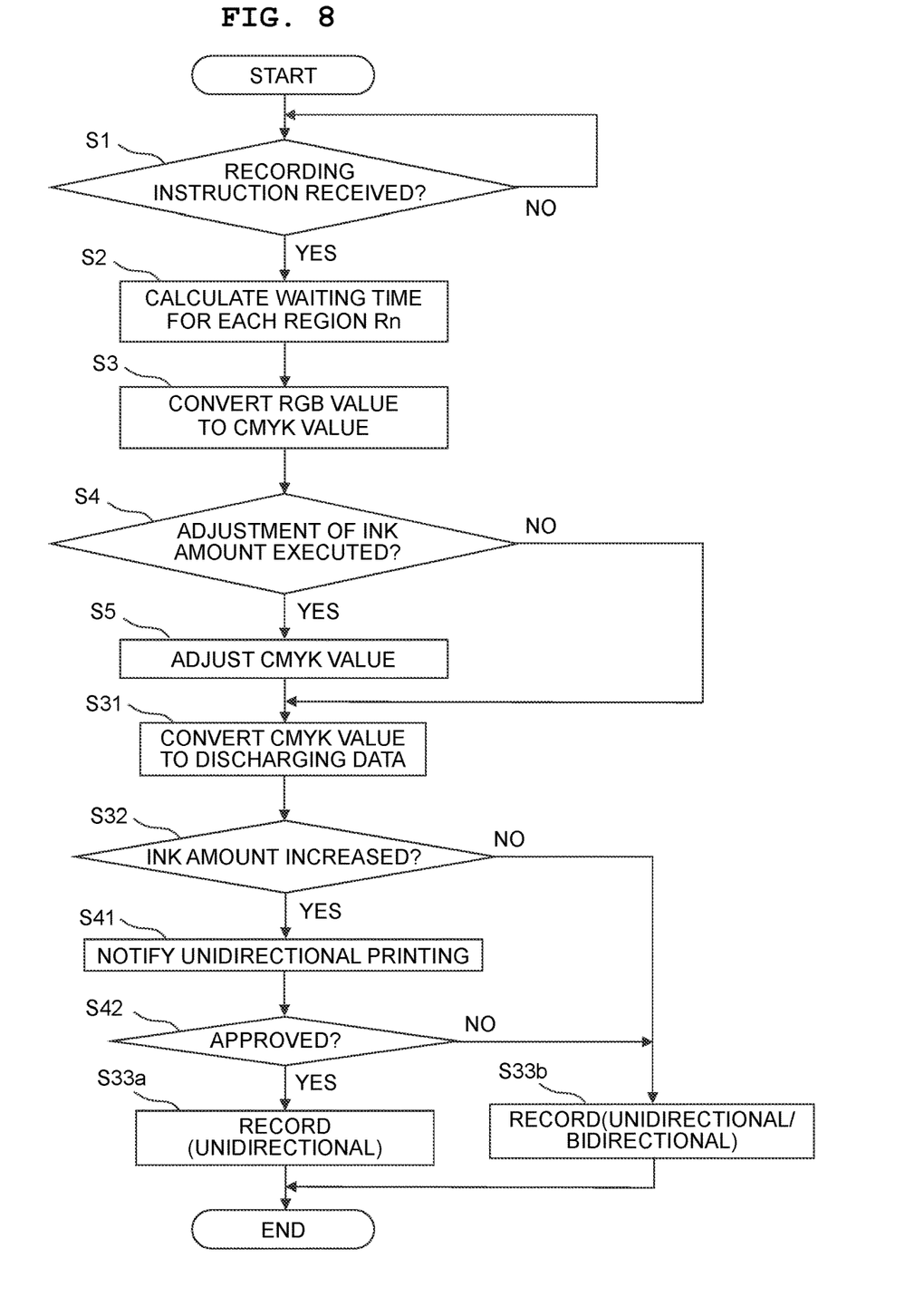
FIG. 8 is a flow chart of an application program corresponding to a print function executed by a CPU of a multifunction peripheral of a fourth embodiment of the present teaching.

If it is determined that the adjustment processing to increase the ink amount has been performed (S32: YES), the CPU 91 provides a notification (S41: Notification processing) via the display 71, voice through a speaker (not depicted), or other means to urge execution of the unidirectional scanning process. For example, such a notification that "Although the recording speed is reduced, the unidirectional scanning processing is necessary to maintain the recording quality" is provided.

After S41, the CPU 91 determines whether the user has indicated the execution of the unidirectional scanning processing based on an input via the display 71 or the operation button 72 (S42).

If it is determined that the user has indicated the execution of the unidirectional scanning processing (S42: YES), the CPU 91 executes the unidirectional scanning processing in the recording control (S33a). On the other hand, if it is determined that the user has not indicated the execution of the unidirectional scanning processing (S42: NO), the CPU 91 determines which of the unidirectional scanning processing and the bidirectional scanning processing is to be performed in the recording control based on the evaluation table (S33b).

If an adjustment is made in the direction to increase the ink amount, the color differences caused by the difference in the overlapping order of ink droplets between the onward movement and the return movement are likely to occur, and it is preferable to perform the unidirectional scanning processing to suppress the color differences. However, the unidirectional scanning processing reduces the recording speed, making a high-speed recording unfeasible. There may be cases where the user prioritizes recording speed over recording quality. Therefore, in this embodiment, instead of forcibly executing the unidirectional scanning processing, the notification is provided to encourage the user to perform the unidirectional scanning processing before the unidirectional scanning processing is executed, and the decision is left to the user. Then, if the user instructs the unidirectional scanning processing, the unidirectional scanning processing is performed. This enables recording as desired by the user.

FIFTH EMBODIMENT

The fifth embodiment of the present teaching will then be described.

In the fifth embodiment (see FIG. 9), a predetermined amount in the conveying process is half the length of each region Rx (see FIG. 5) in the conveyance direction, and two scanning processings are performed for each region Rx.

Figure 9:
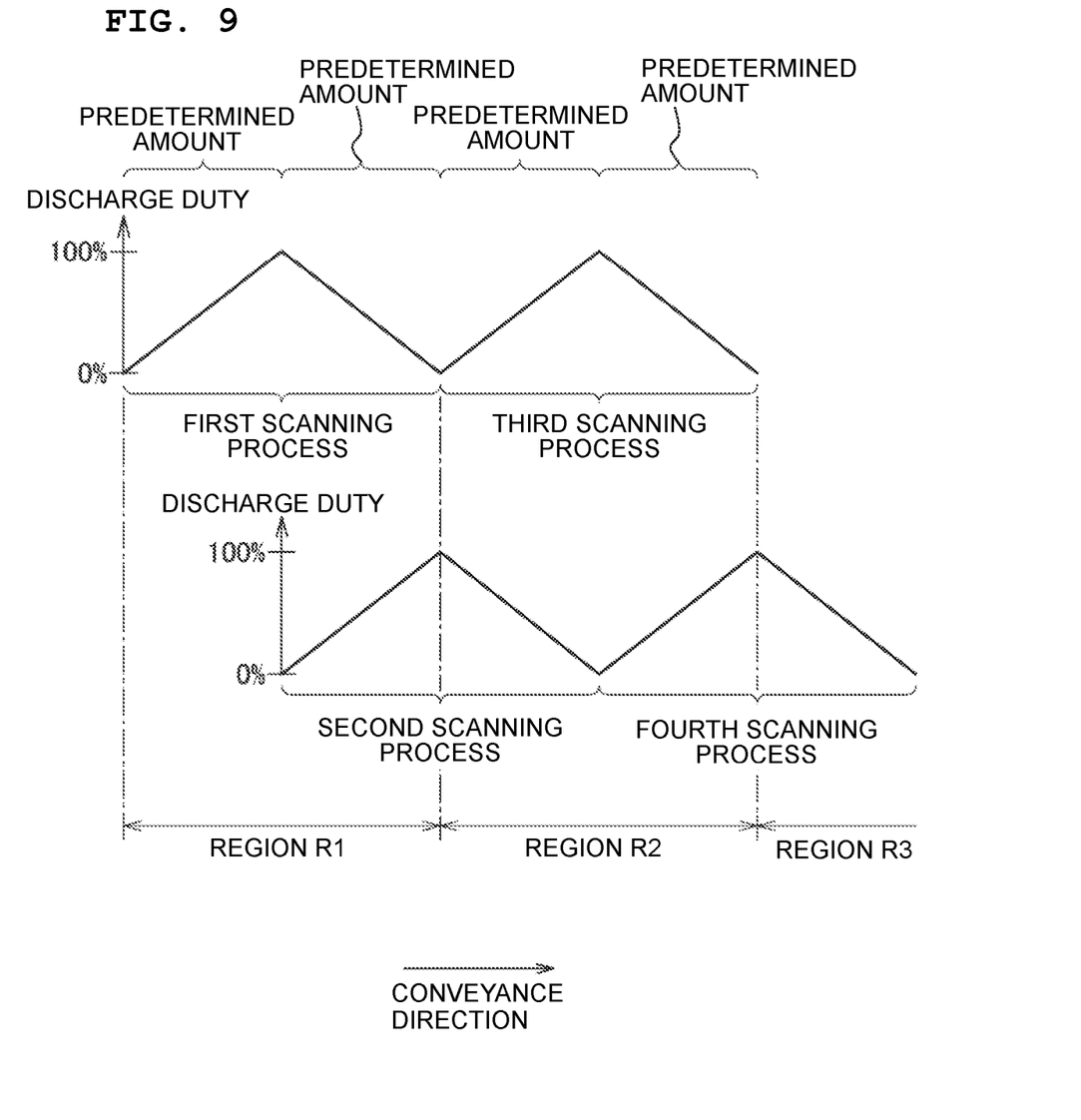
FIG. 9 is a graph of a discharge duty function in a fifth embodiment of the present teaching.

The recording control performed by the CPU 91 includes a first scanning processing, a second scanning processing, a third scanning processing, and a fourth scanning processing. In the first scanning processing, the head 10 performs recording with respect to the region R1. In the second scanning processing, the head 10 performs recording with respect to a region spanning (partially overlapping with) the regions R1 and R2 after a waiting time has elapsed from the first scanning processing. In the third scanning processing, the head 10 performs recording with respect to the region R2 after a waiting time has elapsed from the second scanning processing. In the fourth scanning processing, the head 10 performs recording with respect to a region spanning (partially overlapping with) the regions R2 and R3 after a waiting time has elapsed from the third scanning processing. The region corresponding to the second scanning processing is composed of a downstream half of the region R1 in the conveyance direction and an upstream half of the region R2 in the conveyance direction. The region corresponding to the fourth scanning processing is composed of a downstream half of the region R2 in the conveyance direction and an upstream half of the region R3 in the conveyance direction.

The first scanning processing corresponds to the "first recording processing" of the present teaching, and the second scanning processing corresponds to the "second recording processing" of the present teaching. The region corresponding to the first scanning processing corresponds to the "first region" of the present teaching, and the region corresponding to the second scanning processing corresponds to the "second region" of the present teaching, which overlap with each other.

The image data corresponding to the first scanning processing and the image data corresponding to the second scanning processing are data of complementary patterns. In each scanning processing, discharge duty of the nozzles located at the upstream end of the conveyance direction and at the downstream end of the conveyance direction is 0%. In each scanning processing, the discharge duty of the nozzles located at the center of the conveyance direction is 100%. Normally, the image data that can be recorded in one scanning processing is divided using a mask so that the discharge duty of each nozzle is 100% in the two scanning processings.

Figure 10:
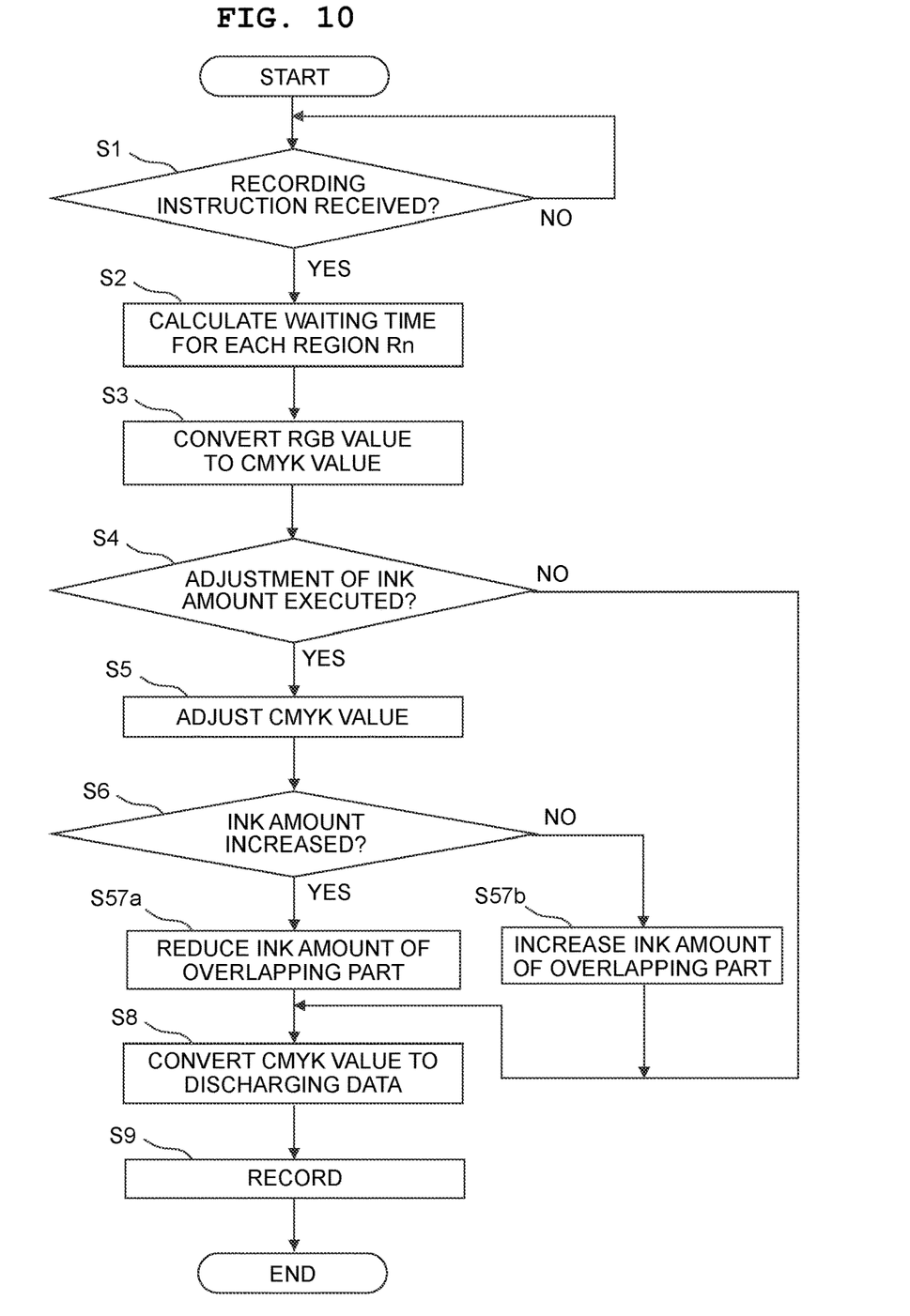
FIG. 10 is a flow chart of an application program corresponding to a print function executed by a CPU of a multifunction peripheral of the fifth embodiment of the present teaching.

The CPU 91 executes the same process as in the first embodiment (see FIG. 4), except for S7a and S7b in the application program corresponding to the print function (see FIG. 10).

If S5 is an adjustment processing to increase the amount of ink (S6: YES), the CPU 91 reduces the amount of ink in an overlapping portion of the regions corresponding to the two scanning processings executed in succession (S57a) instead of S7a. This suppresses the problem that the density of the overlapping portion of the regions corresponding to the two scanning processings executed consecutively becomes dense and appears as a streak or a line.

If S5 is an adjustment processing to reduce the amount of ink (S6: NO), the CPU 91 increases the amount of ink in the overlapping portion of the regions corresponding to the two scanning processings executed consecutively (S57b) instead of S7b. This suppresses the problem that the density of the overlapping portion of the regions corresponding to the two scanning processings executed consecutively becomes thinner and appears as the streak or the line.

SIXTH EMBODIMENT

The sixth embodiment of the present teaching will then be described.

Figure 11A:
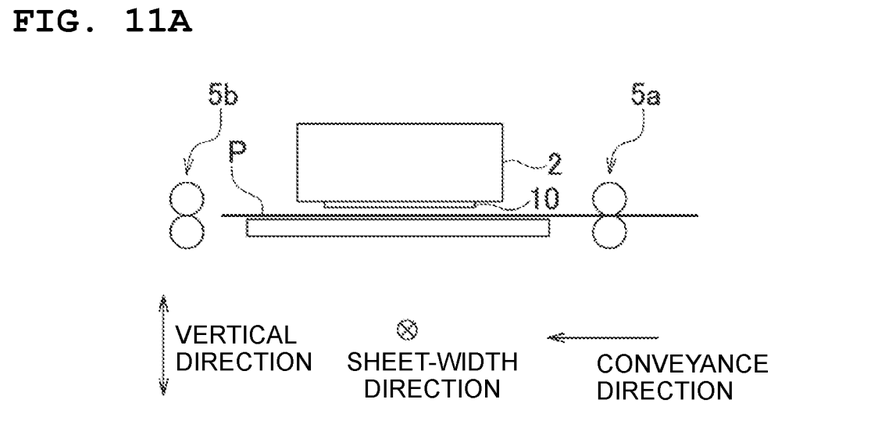
FIGS. 11A-11C are side views to illustrate a double-support recording processing and single-support recording processings in a sixth embodiment of the present teaching.
Figure 11B:
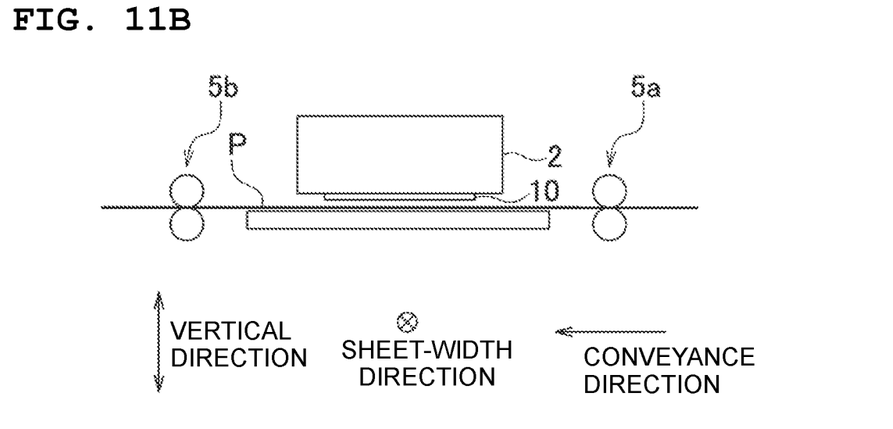
Figure 11C:
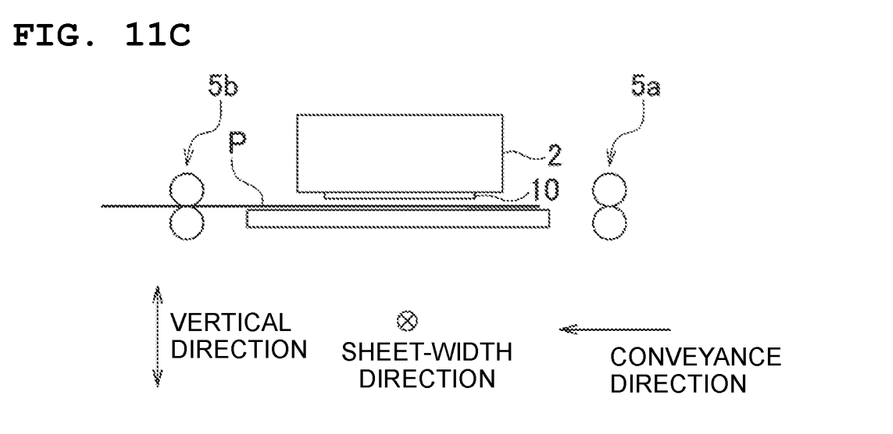

As the paper sheet P is conveyed in the conveying direction by the conveying process, the paper sheet P is supported by the roller pair 5a at first as depicted in FIG. 11A, then is supported by both of the roller pairs 5a and 5b as depicted in FIG. 11B, and then is supported by the roller pair 5b as depicted in FIG. 11C.

The roller pair 5a supports the paper sheet P upstream of the head 10 in the conveying direction, and corresponds to the "first supporting part" of the present teaching. The roller pair 5b supports the paper sheet P downstream of the head 10 in the conveying direction, and corresponds to the "second supporting part" of the resent teaching.

The recording control executed by the CPU 91 includes a double-support recording processing (see FIG. 11B), which causes the head 10 to perform recording in the state that the paper sheet P is supported by both of the roller pairs 5a and 5b, and a single-support recording processing (see FIGS. 11A and 11C), which causes the head 10 to perform recording in the state that the paper sheet P is supported by one of roller pairs 5a and 5b.

In this embodiment, if the CPU 91 executes the adjustment processing to increase the ink amount, the region of the paper sheet P to be recorded in the single-support recording processing (see FIGS. 11A, 11C) is smaller than a case that the adjustment processing is not executed. If the adjustment to increase the ink amount is performed, the paper sheet P can easily swell due to ink penetration, and the posture of the paper sheet P may not be stable in the single-support recording processing, resulting in poor recording quality. In this case, by reducing the region of the paper sheet P to be recorded in the single-support recording processing, degradation of the recording quality can be reduced.

On the other hand, if the CPU 91 executes the adjustment processing to reduce the ink amount, the region of the paper sheet P to be recorded in the single-support recording processing (see FIGS. 11A, 11C) is increased as compared with the case that the adjustment processing is not executed. If the adjustment to reduce the ink amount is performed, it is difficult for the paper sheet P to swell due to the ink penetration, and the posture of the paper sheet P can be maintained in the single-support recording processing, making it difficult for the recording quality to be degraded. In this case, high-speed recording can be achieved by increasing the region of paper sheet P recorded in the single-support recording processing.

SEVENTH EMBODIMENT

The seventh embodiment of the present teaching will then be described.

In this embodiment, the recording control executed by the CPU 91 includes a marginless recording processing in which the ink is discharged from the nozzles 11 to an edge region including an edge of the paper sheet P.

In the marginless recording processing, in a case that the ink is discharged in the edge region, the ink discharged outside of the paper sheet P may become mist. The ink is more likely to become the mist in a case that ink droplets are small in size and light in weight. To prevent the ink from becoming the mist, the size of the ink droplets should be increased.

However, if the size of the ink droplets is increased in a case of executing the adjustment processing to increase the ink amount, the size of the ink droplets may become too large and the image at the edge region may become too dark, resulting in poor recording quality. In addition, in a case that an absorbing member such as a sponge is used to absorb the ink discharged outside of the paper sheet P, the life of the absorbing member may be shortened because the amount of the ink absorbed by the absorbing member is increased. Therefore, in this embodiment, if the CPU 91 executes the adjustment processing to increase the ink amount, the amount of the ink discharged on the edge region in the marginless recording processing is reduced as compared with the case where the adjustment processing is not executed. This suppresses the above problem.

If the adjustment processing to reduce the ink amount is executed, the ink may become the mist due to the smaller ink droplet size. Therefore, in this embodiment, if the CPU 91 executes the adjustment processing to reduce the ink amount, the amount of ink to be discharged on the edge region in the marginless recording processing is increased as compared with the case where the adjustment processing is not executed. This can suppress the above problem.

MODIFIED EXAMPLES

Although the embodiments of the present teaching have been described above, the present teaching is not limited to the above-described embodiments, and various design changes are possible within the scope of the claims.

The configurations of each of the above embodiments may be combined as appropriate. For example, the waiting time may be different between the case in which the adjustment processing is performed and the case in which the adjustment processing is not performed, as in the first embodiment (see FIG. 4), and the criteria for determining whether the scanning processing is the unidirectional scanning processing or the bidirectional scanning processing may be different, as in the second embodiment (see FIG. 6).

In the embodiments described above, although the recording control in the application program corresponding to the print function is described, the same recording control as that in the application program corresponding to the print function may be performed in the application program corresponding to the copy function or the facsimile function, for example.

Although the input unit is the touch-type display 71 in the embodiments described above, the input unit may be an audio input unit.

In the sixth embodiment, the roller pair 5a is the "first supporting part" and the roller pair 5b is the "second supporting part", but it is not limited to this. For example, a corrugating member for giving a corrugated shape to the paper sheet P along the width direction may be used as the "first supporting part". For example, the corrugating member may include a base part covering the roller pair 5a from above and a pressing part extending from the base part to downstream in the conveyance direction to press the paper sheet P from above.

The recording unit is a serial type in the above embodiments, but may be a line type. The recording unit is not limited to the liquid discharging method, but may also be a laser method, a thermal transfer method, etc.

The recording material is ink in the embodiments described above, but may be liquid other than ink (e.g., a process liquid that agglomerates or precipitates components in ink). The recording material is not limited to ink or other liquids, but may also be toner or the like.

The recording medium is not limited to the paper sheet, but may be, for example, cloth, plastic material, etc.

The recording apparatus for the present teaching is not limited to multifunction peripherals. For example, the recording apparatus for the present teaching may be an apparatus with the recording unit but without the reading unit.

What is claimed is:

1. A recording apparatus, comprising:
a recording unit configured to perform recording of an image on a recording medium by using recording material; and
a controller configured to execute a recording control regarding the recording,
wherein the controller is configured to execute an adjustment processing for adjusting an amount of the recording material to be used in the recording, and
the controller is configured to change a processing other than the adjustment processing in the recording control between a case that the adjustment processing is executed and a case that no adjustment processing is executed.

2. The recording apparatus according to claim 1, wherein the recording control includes:
a first recording processing for causing the recording unit to perform the recording on a first region of the recording medium based on a first image data; and
a second recording processing for causing the recording unit to perform the recording on a second region of the recording medium based on a second image data after a waiting time has elapsed from the first recording processing, the second region overlapping with or being adjacent to the first region, and
in the case that the adjustment processing for increasing the amount of the recording material is executed, the controller is configured to increase the waiting time as compared with the case that no adjustment processing is executed.

3. The recording apparatus according to claim 1, wherein the recording control includes:
a first recording processing for causing the recording unit to perform the recording on a first region of the recording medium based on a first image data; and
a second recording processing for causing the recording unit to perform the recording on a second region of the recording medium based on a second image data after a waiting time has elapsed from the first recording processing, the second region overlapping with or being adjacent to the first region, and
in the case that the adjustment processing for reducing the amount of the recording material is executed, the controller is configured to reduce the waiting time as compared with the case that no adjustment processing is executed.

4. The recording apparatus according to claim 1, further comprising:
a scanning unit configured to move the recording unit in a scanning direction;
a conveyor configured to convey the recording medium relative to the recording unit in a conveyance direction intersecting with the scanning direction; and
a memory configured to store an evaluation table in which a plurality of pairs of pixels and a plurality of weight values corresponding to the pairs of pixels respectively are associated with each other,
wherein the recording control includes:
a conveying processing for causing the conveyor to convey the recording medium by a predetermined distance in the conveyance direction; and
a scanning processing for causing the recording unit to perform the recording while causing the scanning unit to move the recording unit in the scanning direction,
the scanning processing includes:
a unidirectional scanning processing for causing the recording unit to perform the recording in any one of an onward movement and a return movement of the recording unit along the scanning direction; and
a bidirectional scanning processing for causing the recording unit to perform the recording in both of the onward movement and the return movement of the recording unit along the scanning direction, and
the controller is configured to:
determine whether the unidirectional scanning or the bidirectional scanning is to be performed as the scanning processing based on the evaluation table; and
in the case that the adjustment processing for increasing the amount of the recording material is executed, change the weight values such that the unidirectional scanning is more easily determined to be performed than the bidirectional scanning, as compared with the case that no adjustment processing is executed.

5. The recording apparatus according to claim 1, further comprising:
a scanning unit configured to move the recording unit in a scanning direction;
a conveyor configured to convey the recording medium relative to the recording unit in a conveyance direction intersecting with the scanning direction; and
a memory configured to store an evaluation table in which a plurality of pairs of pixels and a plurality of weight values corresponding to the pairs of pixels respectively are associated with each other,
wherein the recording control includes:
a conveying processing for causing the conveyor to convey the recording medium by a predetermined distance in the conveyance direction; and
a scanning processing for causing the recording unit to perform the recording while causing the scanning unit to move the recording unit in the scanning direction,
the scanning processing includes:
a unidirectional scanning processing for causing the recording unit to perform the recording in any one of an onward movement and a return movement of the recording unit along the scanning direction; and
a bidirectional scanning processing for causing the recording unit to perform the recording in both of the onward movement and the return movement of the recording unit along the scanning direction, and
the controller is configured to:
determine whether the unidirectional scanning or the bidirectional scanning is to be performed as the scanning processing based on the evaluation table; and
in the case that the adjustment processing for reducing the amount of the recording material is executed, change the weight values such that the bidirectional scanning is more easily determined to be performed than the unidirectional scanning, as compared with the case that no adjustment processing is executed.

6. The recording apparatus according to claim 1, further comprising:
a scanning unit configured to move the recording unit in a scanning direction;
a conveyor configured to convey the recording medium relative to the recording unit in a conveyance direction intersecting with the scanning direction; and
a memory configured to store an evaluation table in which a plurality of pairs of pixels and a plurality of weight values corresponding to the pairs of pixels respectively are associated with each other,
wherein the recording control includes:
a conveying processing for causing the conveyor to convey the recording medium by a predetermined distance in the conveyance direction; and
a scanning processing for causing the recording unit to perform the recording while causing the scanning unit to move the recording unit in the scanning direction,
the scanning processing includes:
a unidirectional scanning processing for causing the recording unit to perform the recording in any one of an onward movement and a return movement of the recording unit along the scanning direction; and
a bidirectional scanning processing for causing the recording unit to perform the recording in both of the onward movement and the return movement of the recording unit along the scanning direction, and
the controller is configured to:
in the case that no adjustment processing is executed, determine whether the unidirectional scanning or the bidirectional scanning is to be performed as the scanning processing based on the evaluation table; and
in the case that the adjustment processing for increasing the amount of the recording material is executed, execute the unidirectional scanning processing.

7. The recording apparatus according to claim 6, wherein in the case that the adjustment processing for increasing the amount of the recording material is executed, the controller is configured to execute a notifying processing for urging the unidirectional scanning processing, and
in a case that an instruction to execute the unidirectional scanning processing is received after the notifying processing, the controller is configured to execute the unidirectional scanning processing.

8. The recording apparatus according to claim 1, wherein the recording control includes:
a first recording processing for causing the recording unit to perform the recording on a first region of the recording medium based on a first image data; and
a second recording processing for causing the recording unit to perform the recording on a second region of the recording medium based on a second image data after a waiting time has elapsed from the first recording processing, the second region overlapping with or being adjacent to the first region, the first image data and the second image data are data of complementary patterns, and in the case that the adjustment processing for increasing the amount of the recording material is executed, the controller is configured to reduce the amount of the recording material for an overlapping part or adjacent parts of the first region and the second region, as compared with the case that no adjustment processing is executed.

9. The recording apparatus according to claim 1, wherein the recording control includes:

a first recording processing for causing the recording unit to perform the recording on a first region of the recording medium; and a second recording processing for causing the recording unit to perform the recording on a second region of the recording medium after a waiting time has elapsed from the first recording processing, the second region overlapping with or being adjacent to the first region, the first recording processing and the second recording processing are processings for performing the recording based on data of complementary patterns which are decomposed from an image data, and in the case that the adjustment processing for reducing the amount of the recording material is executed, the controller is configured to increase the amount of the recording material for an overlapping part or adjacent parts of the first region and the second region, as compared with the case that no adjustment processing is executed.

10. The recording apparatus according to claim 1, further comprising a conveyor configured to convey the recording medium in a conveyance direction, the conveyor including a first supporting part configured to support the recording medium upstream in the conveyance direction with respect to the recording unit and a second supporting part configured to support the recording medium downstream in the conveyance direction with respect to the recording unit, the recording control includes:

a double-support recording processing for causing the recording unit to perform the recording in a state that the recording medium is supported by both of the first supporting part and the second supporting part; and a single-support recording processing for causing the cording unit to perform the recording in a state that the recording medium is supported by one of the first supporting part and the second supporting part, and in the case that the adjustment processing for increasing the amount of the recording material is executed, the controller is configured to reduce a region of the recording medium in which the single-support recording processing is executed, as compared with the case that no adjustment processing is executed.

11. The recording apparatus according to claim 1, further comprising a conveyor configured to convey the recording medium in a conveyance direction, the conveyor including a first supporting part configured to support the recording medium upstream in the conveyance direction with respect to the recording unit and a second supporting part configured to support the recording medium downstream in the conveyance direction with respect to the recording unit, the recording control includes:

a double-support recording processing for causing the recording unit to perform the recording in a state that the recording medium is supported by both of the first supporting part and the second supporting part; and a single-support recording processing for causing the cording unit to perform the recording in a state that the recording medium is supported by one of the first supporting part and the second supporting part, and in the case that the adjustment processing for reducing the amount of the recording material is executed, the controller is configured to increase a region of the recording medium in which the single-support recording processing is executed, as compared with the case that no adjustment processing is executed.

12. The recording apparatus according to claim 1, wherein the recording material is liquid, the recording unit includes a plurality of nozzles, the recording control includes a marginless recording processing for discharging the liquid from the nozzles on an edge region including an edge of the recording medium, and in the case that the adjustment processing for increasing the amount of the recording material is executed, the controller is configured to reduce an amount of the liquid to be discharged on the edge region in the marginless recording processing, as compared with the case that no adjustment processing is executed.

13. The recording apparatus according to claim 1, wherein the recording material is liquid, the recording unit includes a plurality of nozzles, the recording control includes a marginless recording processing for discharging the liquid from the nozzles on an edge region including an edge of the recording medium, and in the case that the adjustment processing for reducing the amount of the recording material is executed, the controller is configured to increase an amount of the liquid to be discharged on the edge region in the marginless recording processing, as compared with the case that no adjustment processing is executed.

* * * * *